United States Patent Office 3,642,804
Patented Feb. 15, 1972

3,642,804
ALKYLENEPIPERIDINOTHIO BENZOTHIAZOLES
John Joseph D'Amico, Akron, and Darrell Dexter Mullins, Norton, Ohio, assignors to Monsanto Company, St. Louis, Mo.
No Drawing. Filed Oct. 22, 1969, Ser. No. 868,635
Int. Cl. C07d 29/36
U.S. Cl. 260—293.57
5 Claims

ABSTRACT OF THE DISCLOSURE

Sulfenamides of the formula

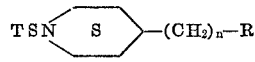

wherein R is aryl, —NHST, or 1-R'-4-piperidinyl where R' is lower alkyl, lower hydroxyalkyl, or —ST, and T is 2-benzothiazolyl or substituted 2-benzothiazolyl where the substituents are chloro, bromo, fluoro, iodo, hydroxy, nitro, alkyl, or lower alkoxy, and $n$ is an integer of one to three. The compounds are biological toxicants and also accelerators for the vulcanization of sulfur-vulcanizable diene rubber.

FIELD OF THE INVENTION

This invention relates to alkylenepiperidinothio benzothiazoles. These compounds belong to the general class called sulfenamides. Sulfenamides are classified in a number of subclasses in Class 260 of the Patent Office classification system. Subclasses in which they are frequently found are 79.5, 306.0–.6, and 788.

BACKGROUND OF THE INVENTION

Benzothiazolesulfenamides are an important sub group of the sulfenamide class. For example, 2-(morpholinothio)benzothiazole has achieved wide commercial acceptance as a delayed-action accelerator of vulcanization. The aforesaid sulfenamide and the related 2-(piperidinothio)benzothiazole are disclosed in Zaucker, U.S. Reissue Pat. 19,286, Aug. 21, 1934. These sulfenamides are also chemical promoters for the heat treatment of rubber and carbon black as described by Doak, U.S. Pat. 2,891,924. A few benzothiazolesulfenamides have been reported to be biological toxicants useful for the control or destruction of undesired vegetation and microorganisms.

The sulfenamide accelerators exhibit a definite induction period before the onset of vulcanization. The delayed-action property, combined with good curing characteristics, is the reason the sulfenamide accelerators have found wide use in the rubber processing industry.

SUMMARY OF THE INVENTION

We have discovered a new class of sulfenamides of the formula

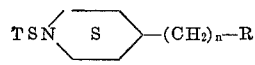

wherein R is aryl, —NHST, or 1 R' 4-piperidinyl where R' is lower alkyl, lower hydroxyalkyl, or —ST, and T is 2-benzothiazolyl or substituted 2-benzothiazolyl where the substituents are chloro, bromo, fluoro, iodo, hydroxy, nitro, alkyl, or lower alkoxy, and $n$ is an integer of one to three. These compounds are biological toxicants as well as delayed-action accelerators.

Aryl is a univalent organic radical the free valence of which belongs to an aromatic carbocyclic nucleus and not to a side chain. Aryl radicals of 6 to 10 carbon atoms are preferred, such as phenyl or naphthyl. Both unsubstituted and substituted aryl radicals are suitable for practice of the invention. The substituents may be alkyl, alkoxy, nitro, chloro, bromo, fluoro, iodo or hydroxy. It is preferred that the carbocyclic nucleus represented by R contain not more than one electronegative substituent. Alkyl radicals are aliphatic radicals of the series $C_nH_{2n+1}$. Alkyl radicals of 1 to 10 carbon atoms are preferred. The alkyl radical may be primary, secondary or tertiary and the primary alkyl may be branched or unbranched. As indicated above, the alkyl radical may contain hydroxy substituents. Alkyl radicals containing only one hydroxy group are preferred.

Typical compounds which may be made in accordance with this invention are:

2-[4-(benzyl)piperidinothio]benzothiazole,
2-[4-(phenylethyl)piperidinothio]benzothiazole,
2-[4-(3-phenylpropyl)piperidinothio]benzothiazole,
2,2'-[methylenebis(4,1-piperidinediylthio)]bis benzo-
2,2'-[dimethylenebis(4,1-piperidinediylthio)]bis benzothiazole,
2,2'-[trimethylenebis(4,1-piperidinediylthio)]bis benzothiazole,
1-(2-benzothiazolylthio)-1'-(methyl)-p,p'-methylene dipiperidine,
1-(2-benzothiazolylthio)-1'-(ethyl)-p,p'-methylene dipiperidine,
1-(2-benzothiazolylthio)-1'-(propyl-p,p'-methylene dipiperidine,
1-(2-benzothiazolylthio)-1'-(hydroxymethyl)-p,p'-methylene dipiperidine,
1-(2-benzothiazolylthio)-1'-(2-hydroxyethyl)-p,p'-methylene dipiperidine,
1-(2-benzothiazolylthio)-1'-(3-hydroxypropyl)-p,p'-methylene dipiperidine,
1-(2-benzothiazolylthio)-1'-(methyl)-p,p'-dimethylene dipiperidine,
1-(2-benzothiazolylthio)-1'-(ethyl)-p,p'-dimethylene dipiperidine,
1-(2-benzothiazolylthio)-1'-(propyl)-p,p'-dimethylene dipiperidine,
1-(2-benzothiazolylthio)-1'-(hydroxymethyl)-p,p'-dimethylene dipiperidine,
1-(2-benzothiazolylthio)-1'-(2-hydroxyethyl)-p,p'-dimethylene dipiperidine,
1-(2-benzothiazolylthio)-1'-(3-hydroxypropyl)-p,p'-dimethylene dipiperidine,
1-(2-benzothiazolylthio)-1'-(methyl)-p,p'-trimethylene dipiperidine,
1-(2-benzothiazolylthio)-1'-(ethyl)-p,p'-trimethylene dipiperidine,
1-(2-benzothiazolylthio)-1'-(propyl)-p,p'-trimethylene dipiperidine,
1-(2-benzothiazolylthio)-1'-(hydroxymethyl)-p,p'-trimethylene dipiperidine,
1-(2-benzothiazolylthio)-1'-(2-hydroxyethyl)-p,p'-trimethylene dipiperidine,
1-(2-benzothiazolylthio)-1'-(3-hydroxypropyl)-p,p'-trimethylene dipiperidine,
N-[1-(2-benzothiazolylthio)piperid-4-ylmethyl]-2-benzothiazole sulfenamide,
N-2-[1-(2-benzothiazolylthio)piperid-4-ylethyl]-2-benzothiazole sulfenamide,
N-3-[1-(2-benzothiazolylthio)-piperid-4-ylpropyl]-2-benzothiazole sulfenamide.

Related compounds where the before-mentioned substituents are attached to the carbocyclic ring of the benzothiazole radical may also be made.

The sulfenamides of this invention have a number of advantageous properties. The compounds inhibit the growth of microorganisms. The compounds also impart a rapid cure to sulfur-vulcanizable diene rubber stocks, yet possess processing safety, and produce vulcanizates with excellent physical properties. The compounds are solids which simplify purification procedures since only recrystallization is required. Solids are also preferred in dry blending operations commonly used in the rubber industry. Another advantage is that the compounds may be economically produced by simple methods. These and other advantages will become apparent as the description of the invention proceeds.

PREFERRED EMBODIMENTS

The compounds of this invention may be prepared by the reaction of 2-benzothiazolesulfenamide with the appropriate 4-substituted piperidines. The amines used in the preparations disclosed, infra, are commonly available intermediates. Details of the preparation of typical examples and their properties are described below.

EXAMPLE 1

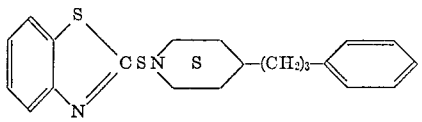

2 - [4 - (3-phenylpropyl)piperidinothio]benzothiazole is prepared in the following manner: To a stirred slurry of 37.6 grams (0.2 mole) of 2-benzothiazolesulfenamide in 500 ml. of isopropyl alcohol, there is added 61.0 grams (0.3 mole) of 4-[(3-phenyl)-1-propyl]piperidine in one portion. The mixture is heated with stirring for three hours at 80°–83° C. Ammonia is evolved during this period. The reaction mixture is filtered hot (no solids recovered), the filtrate is cooled to 10° C. and 1500 ml. of ice water is added. The slurry which forms is held with stirring at 0°–10° C. for 30 minutes. The slurry is filtered; the solid is washed with water until neutral and is air-dried at 25°–30° C. The dry solid constitutes 72 grams (98% yield) of the aforesaid compound as product. Recrystallized from heptane, the product melts at 75°–76° C. Analysis of the product gives 7.45% nitrogen and 17.58% sulfur compared to 7.60% nitrogen and 17.40% sulfur calculated for $C_{21}H_{24}N_2S_2$.

EXAMPLE 2

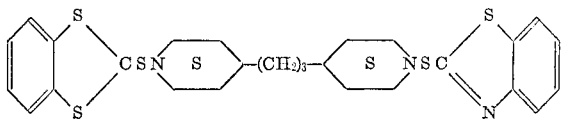

2,2' - [trimethylenebis(4,1-piperidinediylthio)]bis benzothiazole is prepared in the following manner: A mixture of 56.4 grams (0.30 mole) of 2-benzothiazolesulfenamide, 33.8 grams (0.16 mole) of bis-4,4'-piperidinyl propane and 600 ml. of isopropyl alcohol is stirred at refluxing temperature for 3 hours. The product which is insoluble in isopropyl alcohol is collected by filtering the hot reaction mixture and washed with isopropyl alcohol. There are obtained 72 grams (89% yield) of the aforesaid compound as product. Recrystallized from ethyl acetate the product melts at 144.0–144.5° C. Analysis of the product gives 10.25% nitrogen and 23.88% sulfur compared to 10.36% nitrogen and 23.72% sulfur calculated for $C_{27}H_{32}N_4S_4$.

EXAMPLE 3

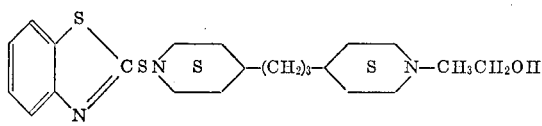

1,2-benzothiazolylthio) - 1' - (2-hydroxyethyl)-p,p'-trimethylene dipiperidine is prepared in a manner similar to Example 1. The amine used is 1-(2-hydroxyethyl)-p,p'-trimethylene dipiperidine. There are obtained 83 grams (99% yield) of the aforesaid compound as product. Recrystallized from a heptane-ethanol mixture, the melting point is 72°–73° C. Analysis of the product gives 9.77% nitrogen and 15.47% sulfur compared to 10.01% nitrogen and 15.28% sulfur calculated for $C_{22}H_{33}N_3OH_2$.

EXAMPLE 4

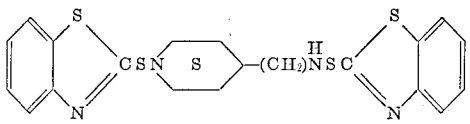

N-[1-(2-benzothiazolylthio)piperid- - 4 - ylmethyl]-2-benzothiazolesulfenamide is prepared by the method of Example 2 from 56.4 grams (0.30 mole) of 2-benzothiazolesulfenamide and 17.0 grams (0.17 mole) of 4-aminomethyl piperidine. There are obtained 42 grams (63% yield) of the aforesaid compound, M.P. 158°–159° C., as the product. Analysis of the product gives 12.38% nitrogen and 28.50% sulfur compared to 12.60% nitrogen and 28.85% sulfur calculated for $C_{20}H_{20}N_4S_4$.

The new compounds are accelerators in the vulcanization of natural and synthetic sulfur-vulcanizable rubbers. Synthetic rubbers that can be vulcanized with sulfur include the diene rubbers, examples of which are polymers of 1,3-butadienes, for example, of 1,3-butadiene itself and of isoprene, copolymers of 1,3-butadienes with other monomers, for example, styrene, acrylonitrile, isobutylene or methyl methacrylate, and polyolefin rubbers, for example, ethylene propylene terpolymers [EPDM]. EPDM rubber and butyl rubber illustrate suitable diene rubber of low unsaturation.

The amount of accelerator used depends on a number of factors such as process conditions, type of elastomer, use of the vulcanized product, other components in the recipe and other variables to which the compounder must address himself. The amount is, however, usually within the range of 0.1 to 5 parts by weight, and more often within the range of 0.3 to 2 parts by weight per 100 parts by weight of rubber. The preferred usage generaly falls within the range of 0.5 to 1.5 parts by weight accelerator.

Accelerating amounts of the new compounds are incorporated into natural rubber compositions and into styrene-butadiene copolymer compositions. The cure characteristics are determined by means of the Monsanto Oscillating Disc Rheometer described by Decker, Wise, and Guerry in Rubber World, December 1962, page 68. From the Rheometer data, R.M.T. is the maximum torque in Rheometer units, $t_2$ is the time in minutes for a rise of two Rheometer units above the minimum reading and $t_{90}$ is the time required to obtain a torque 90% of the maximum.

Mooney scorch times at 121° C. for natural rubber and at 135° C. for synthetic rubber are determined by means of a Mooney Plastometer. The time in minutes ($t_5$) required for the Mooney reading to rise five points above the minimum viscosity is recorded. Each composition contains Santoflex 13, an antidegradant, which is N-(1,3-dimethylbutyl-N'-phenyl-p-phenylenediamine. All quantities indicated are parts by weight.

Vulcanizable compositions are compounded comprising:

Masterbatch 1

| | Parts |
|---|---|
| Natural rubber | 100.0 |
| Furnace Black (ISAF) | 45.0 |
| Zinc oxide | 3.0 |
| Stearic acid | 2.0 |
| Hydrocarbon softener | 5.0 |
| Santoflex 13 | 2.0 |
| Total | 157.0 |

2.0 parts of sulfur and 0.6 part of accelerator are mixed with a portion of the above masterbatch and the composition heated at a temperature of 144° C. The results are shown in Table I.

Accelerator:     Stock
2 - [4-(3-phenylpropyl)piperidinothio]benzothiazole _____ A Accelerator: Stock
2,2' - [trimethylenebis(4,1 - piperidinediylthio]bis benzothiazole _____ B
1 - (2-benzothiazolylthio) - 1' - (2-hydroxyethyl)-p,p'-trimethylene dipiperidine _____ C
N - [1-(2-benzothiazolylthio)piperid - 4 - ylmethyl]-2-benzothiazolesulfenamide _____ D

TABLE I

| Stock | Mooney scorch $t_s$ | R.M.T. | $t_2$ | $t_{90}$ |
|---|---|---|---|---|
| A | 26.6 | 51.4 | 8.2 | 22.7 |
| B | 24.5 | 51.3 | 7.2 | 21.7 |
| C | 21.1 | 48.1 | 6.8 | 23.5 |
| D | 22.5 | 49.3 | 6.7 | 21.0 |

Vulcanizable synthetic rubber compositions are compounded comprising:

Masterbatch 2

Styrene-butadiene copolymer rubber (oil extended) _____ 137.5
Furnace Black (ISAF) _____ 65.0
Zinc oxide _____ 3.0
Stearic acid _____ 1.0
Hydrocarbon softener _____ 1.5
Santoflex 13 _____ 2.0

Total _____ 210.0

1.8 parts of sulfur and 1.2 parts of the experimental accelerator are compounded with portions of masterbatch 2 and are cured at 153° C. The results are shown in Table II.

TABLE II

| Stock | Mooney scorch $t_s$ | R.M.T. | $t_2$ | $t_{90}$ |
|---|---|---|---|---|
| A | 21.7 | 51.3 | 8.5 | 21.7 |
| B | 20.6 | 52.8 | 8.2 | 19.0 |
| C | 19.6 | 48.9 | 7.8 | 19.2 |
| D | 19.5 | 52.8 | 7.7 | 18.5 |

The data in Table I and Table II indicate that compounds of this invention function well as accelerators for the vulcanization of both natural rubber and synthetic styrene-butadiene rubber and impart a high degree of processing safety.

As illustrative of biological activity of the compounds of this invention, the following experiments demonstrated control of fungi and of bactreia. One percent stock solutions of the compounds, of Examples 1 through 4 were prepared in a non-toxic solvent and diluted in agar to provide samples containing the test materials at concentrations of one part per thousand. Petri dishes were filled with the test mixtures and the plates thus prepared inoculated with the test organisms and incubated for 48 hours at 37° C. At the end of the incubation period inspection of the plates inoculated with the test materials showed complete inhibition of growth of the organisms shown in Table III; identical agar test plates, mith no test material present, showed normal uninhibited growth of the organisms. Agar test plates inoculated with 2-(piperidinothio) benzothiazole showed normal uninhibited growth of the organisms.

Table III

Compound: Complete inhibition of
Example 1 _____ S. aureus—S. typhosa—A. niger.
Example 2 _____ S. aureus—A. niger.
Example 3 _____ S. aureus—S. typhosa—A. niger.
Example 4 _____ S. aureus.

The foregoing experiments demonstrate that the compounds protect against the destructive effect of microorganisms including fungi and bacteria. Application of the test chemical to the area to be protected, in which the organism may or may not already be present, in a concentration toxic to such microorganisms, affords a high degree of protection. For achieving these various objects, it is often advantageous, where the compounds are applied in an aqueous medium, to incorporate into the aqueous medium a surface-active agent in small amounts sufficient to lower the surface tension of water. The amount will usually be within the range of 0.01–1.0%. Besides water, organic solvents, and admixtures thereof, suitable inert carriers which include finely divided solids, as for example clay and silica, may be added.

Application of toxic amounts of the compounds of this invention to areas subject to attack by microorganisms will completely inhibit their growth. Certain microorganisms may be satisfactorily controlled by application of solutions containing the toxicants in concentrations of one part toxicant to 10,000 parts diluent.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

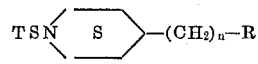

wherein R is phenyl or naphthyl, —NHST, or 1-R'-4-piperidinyl where R' is lower alkyl, lower hydroxyalkyl, or —ST, and T is 2-benzothiazolyl or substituted 2-benzothiazolyl where the substituents are chloro, bromo, fluoro, iodo, hydroxy, nitro, alkyl of 1 to 10 carbon atoms, or lower alkoxy, and $n$ is an integer of one to three.

2. A compound according to claim 1 wherein R is phenyl, T is 2-benzothiazolyl, and $n$ is three.

3. A compound according to claim 1 wherein R is 4-[1-(2-hydroxyethyl)]piperidinyl, T is 2-benzothiazolyl, and $n$ is three.

4. A compound according to claim 1 wherein R is 4-[1-(2-benzothiazolylthio)]piperidinyl, T is 2-benzothiazolyl, and $n$ is three.

5. A compound according to claim 1 wherein R is —NHST, T is 2-benzothiazolyl, and $n$ is one.

References Cited
UNITED STATES PATENTS 2,271,834  2/1942  Carr _____ 260—293.45
2,906,754  9/1959  D'Amico _____ 260—268 S
3,301,832  1/1967  D'Amico _____ 260—786

HENRY R. JILES, Primary Examiner

S. D. WINTERS, Assistant Examiner

U.S. Cl. X.R.
260—786; 424—267